US010673720B2

(12) United States Patent
Aygun et al.

(10) Patent No.: US 10,673,720 B2
(45) Date of Patent: *Jun. 2, 2020

(54) SYSTEMS AND METHODS FOR MEASURING MEDIA PERFORMANCE ON END-USER DEVICES

(71) Applicant: Google LLC, Mountain View, CA (US)

(72) Inventors: Eser Aygun, London (GB); Eugenio Jorge Marchiori, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/405,641

(22) Filed: May 7, 2019

(65) Prior Publication Data

US 2019/0268249 A1 Aug. 29, 2019

Related U.S. Application Data

(63) Continuation of application No. 15/343,455, filed on Nov. 4, 2016, now Pat. No. 10,313,213.

(51) Int. Cl.
*H04L 12/26* (2006.01)
*H04L 29/08* (2006.01)
*G06Q 30/02* (2012.01)

(52) U.S. Cl.
CPC ......... *H04L 43/08* (2013.01); *G06Q 30/0277* (2013.01); *H04L 67/02* (2013.01); *H04L 67/34* (2013.01)

(58) Field of Classification Search
CPC ......... H04L 67/22; H04L 67/02; H04L 41/12; H04L 41/06; H04L 29/08; G06F 17/30; G06F 17/00; G06F 17/22; G06F 21/10
USPC ....................................................... 709/217
See application file for complete search history.

(56) References Cited

U.S. PATENT DOCUMENTS

| 2002/0008703 | A1* | 1/2002 | Merrill | G06F 8/00 345/473 |
| 2009/0315894 | A1* | 12/2009 | Goodwin | G06T 13/00 345/473 |
| 2013/0135215 | A1* | 5/2013 | Bozarth | G06F 3/147 345/173 |

* cited by examiner

*Primary Examiner* — Tu T Nguyen
(74) *Attorney, Agent, or Firm* — Foley & Lardner LLP

(57) ABSTRACT

Some sponsored content items are implemented as custom HTML5 animated media. While performance, particularly any performance problems displaying an item as a result of low frames per second, may be measured under controlled conditions, it is difficult to test all possible configurations of variables such as different websites, combinations of sponsored content items displayed simultaneously, user devices, different browsers, and many others. Information on performance under actual conditions can be measured by receiving information on a measurement of frame intervals and idle times on the client side during actual sponsored content item display and analyzing the received data.

20 Claims, 3 Drawing Sheets

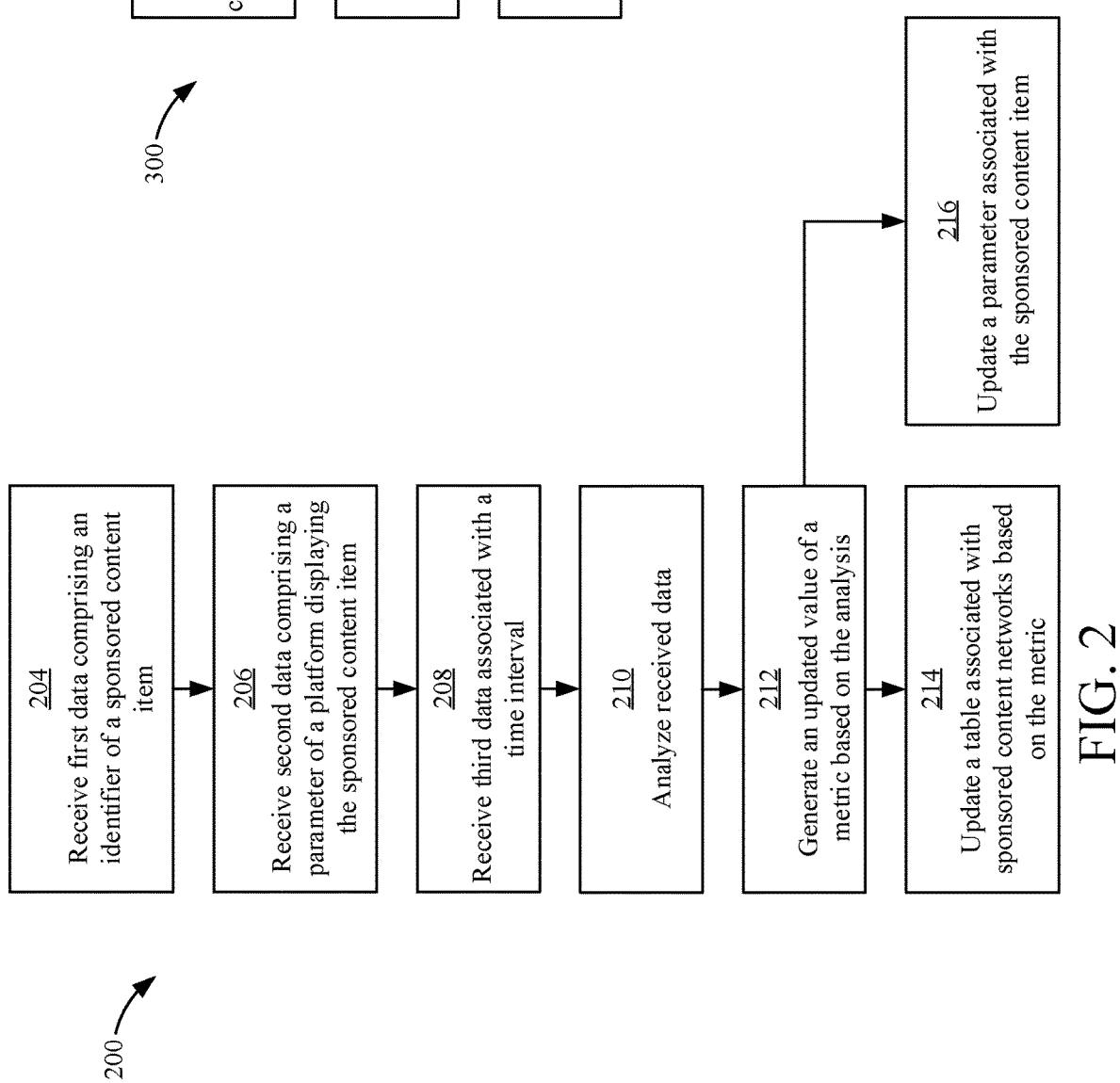

SYSTEMS AND METHODS FOR MEASURING MEDIA PERFORMANCE ON END-USER DEVICES

CROSS-REFERENCE TO RELATED PATENT APPLICATIONS

This application claims priority to and is a continuation of U.S. application Ser. No. 15/343,455, titled "Systems and Methods for Measuring Media Performance on End-User Devices" filed Nov. 4, 2016, incorporated herein by reference in its entirety.

BACKGROUND

Animated content may be provided by publishers on the internet using hypertext markup language, such as HTML5. However, this type of content executes in the same thread as the rest of an associated website, which can result in reproduction of the animated content at low frame per second (FPS) rates, excessive use of end-user device resources, or poor scrolling or navigation experience. Testing performance of such animated media under controlled conditions is often not comprehensive due to the number of different configurations that must be tested, e.g., different web sites, combinations of content, different user devices, different browsers, etc.

SUMMARY

Implementations described herein relate to systems and methods for measuring and quantifying the performance of media such as sponsored content items using video, animation, navigation, and scrolling. In some implementations, the media is implemented in custom HTML5 sponsored content items. While performance, particularly any performance problems displaying an item as a result of low frames per second, may be measured under controlled conditions, it is difficult to test all possible configurations of variables such as different websites, combinations of sponsored content items displayed simultaneously, user devices, different browsers, and many others. Information on performance under actual conditions can be measured by receiving information on a measurement of frame intervals and idle times on the client side during actual sponsored content item display. Methods such as requestAnimationFrame and requestIdleCallback can be used (e.g., in JavaScript included in the container page of the sponsored content item) to generate this information. By calling those methods the time interval between frames can be calculated and compared to an interval that should be close to '16.7' ms when the browser is animating at sixty frames per second. A lengthier interval may indicate lag and a poor user experience. Time available to the browser for low priority tasks can also be sent to determine the amount of work the browser has to do between frames. If the time available is close to '16.7' ms, then the browser is spending most of the time idle and is not overloaded with other tasks.

In some implementations, the data is accumulated for a set amount of time or a set amount of data points before initiating a request to send the data to the server in a data structure (e.g., an array). Once performance data is received, various possible actions include determining a success metric (e.g., performance score) and evaluating potential sponsored content items for similar features prior to serving them. Success metrics may be determined by using one or more of average frame rate or average idle time, or a ratio of frames that are complying with a determined performance threshold. Evaluating potential sponsored content items for similar features to poorly performing sponsored content items may involve training a machine learning model to detect potentially low performing sponsored media by analyzing for features such as the animation framework being used (e.g., GWD, create JS, etc.), size of the assets used, size of the images used, and keywords in the JavaScript Code. Sponsored content items already being served may be penalized in auctions based on poor success metrics or preferentially choose different versions of the same sponsored content items that have higher success metrics. Success metrics may be stored not only for the sponsored content items, but also for publishers and platforms, or multiple such metrics may be considered and may be utilized using weighted parameters.

Analyzing performance of media allows for effective selection of content items based on metrics of performance for content items as associated with various parameters of the devices leads to better performance overall for playing the media on the devices. Specific devices perform better by no longer receiving specific content items or perhaps items from entire content networks that perform poorly on the respective specific devices. Further analysis of specific features of the content items as associated with decreased performance can lead to fixing or improving existing content items with small changes. In some instances, the improvements to the performance of the content items can be done automatically after analysis. In some instances, the decreased performance due to specific features of the content items may further be associated with one or more parameters of the devices playing the content items and any improvements or fixes only have to be done for the devices with those parameters. Databases indexed by one or more of device parameters, metrics, or by content item further allow for effective selection of content items based on metrics of performance as associated with various parameters of the devices.

One implementation relates to a method for receiving, via a network connection, first data identifying a time interval between a value of a first timestamp and a value of a second time stamp. The first timestamp and second timestamp is obtained consequent to a script executing on a browser. Execution of the script results in the execution of operations to send, to the browser, a first request to call a specified function to update an animation, receive, consequent to sending the first request, the value of the first timestamp, store the value of the first timestamp, send, to the browser, a second request to call the specified function to update the animation, and receive, consequent to sending the second request, the value of the second timestamp. The method further comprises receiving, via the network connection, second data comprising an identifier of a first sponsored content item associated with the animation and third data comprising a parameter of a platform displaying the animation. The method further comprises generating an updated value of a metric of the first sponsored content item based on the time interval above a predetermined value of the time interval, storing the updated value of the metric and an association of the updated value of the metric with the first sponsored content item and the third data, receiving a request for a sponsored content item, the request comprising data matching a value of the third data, selecting a second sponsored content item other than the first sponsored content item based on the updated value of the metric associated with the first sponsored content item and the third data, and transmitting, via the network connection, the second sponsored content item.

The implementation of the method may further comprise the script when executed, executing operations to send, to the browser, a third request to call a second specified function to return an object comprising a function which returns a value of a time remaining to do work or a value of zero, execute the function of the object to get the value of the time remaining to do work or the value of zero, and store the value of the time remaining to do work or the value of zero. The method may further comprise further basing the updated value of the metric of the first sponsored content item on the value of the time remaining to do work or the value of zero.

Another implementation relates to a system comprising one or more processors, a network connection, and data storage. The data storage is operatively coupled to the one or more processors and the data storage stores instructions that when executed by the one or more processors, cause the one or more processors to perform operations comprising, receiving, via the network connection, first data identifying a time interval between a value of a first timestamp and a value of a second time stamp, the first timestamp and second timestamp obtained consequent to a script executing on a browser. The script when executed, executes operations to send, to the browser, a first request to call a specified function to update an animation, receive, consequent to sending the first request, the value of the first timestamp, store the value of the first timestamp, send, to the browser, a second request to call the specified function to update the animation, and receive, consequent to sending the second request, the value of the second timestamp. The data storage further stores instructions to cause the one or more processors to perform operations further comprising, receiving, via the network connection, second data comprising an identifier of a first sponsored content item associated with the animation, receiving, via the network connection, third data comprising a parameter of a platform displaying the animation, generating an updated value of a metric of the first sponsored content item based on the time interval above a predetermined value of the time interval, storing the updated value of the metric and an association of the updated value of the metric with the first sponsored content item and the third data, receiving a request for a sponsored content item, the request comprising data matching a value of the third data, selecting a second sponsored content item other than the first sponsored content item based on the updated value of the metric associated with the first sponsored content item and the third data, and transmitting, via the network connection, the second sponsored content item.

Yet a further implementation relates to a non-transitory computer-readable storage media storing instructions executable on a computer processor that, when executed by one or more processing devices or processors of a computing system, cause the one or more processing devices to perform operations. The operations may include the steps of the method above.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2 is a block diagram depicting an implementation of a method of receiving and analyzing data to generate an updated value of a metric.

FIG. 3 is a block diagram depicting an implementation of a method of selecting a sponsored content item in response to a request.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Following below are more detailed descriptions of various concepts related to, and implementations of, methods, apparatuses, and systems for providing information on a computer network. The various concepts introduced above and discussed in greater detail below may be implemented in any of numerous ways as the described concepts are not limited to any particular manner of implementation. Examples of specific implementations and applications are provided primarily for illustrative purposes.

In some instances, systems and methods are desirable for measuring and quantifying the performance of media such as sponsored content items. The systems and methods allow the gathering of performance data for diverse conditions that would be impractical to gather in a test system or systems. In some instances the infrastructure is not in place to measure the performance of media when using HTML5 in the many different possible environments, including devices used, operating systems, browsers, and the like. Gathering of data related to performance on the end user devices while the media is displayed can be used to measure the performance of the media. In some implementations, small scripts (e.g., JavaScript) are run during the animation of the media to gather and report the data. For example, data related to time intervals between frames and idle time of the executing browsers. Analyzing performance of media may allow more effective managing of sponsored content items by turning on or off specific sponsored content items (ads) or even entire networks depending on certain parameters available in a sponsored content item request. Turning off entire networks for certain requests may be based on metrics regarding sponsored content items with poor performance for one or more parameters in the request.

For purposes of reading the description of the various implementations below, the following descriptions of the sections of the specification and their respective contents may be helpful:

Section A describes an environment for measuring and quantifying the performance of media such as sponsored content items which may be useful for practicing implementations described herein;

Section B describes implementations of methods for measuring and quantifying the performance of media such as sponsored content items.

Section C describes a network environment and computing environment which may be useful for practicing implementations described herein.

A. Measuring and Quantifying the Performance of Media Environment

Figure 1:
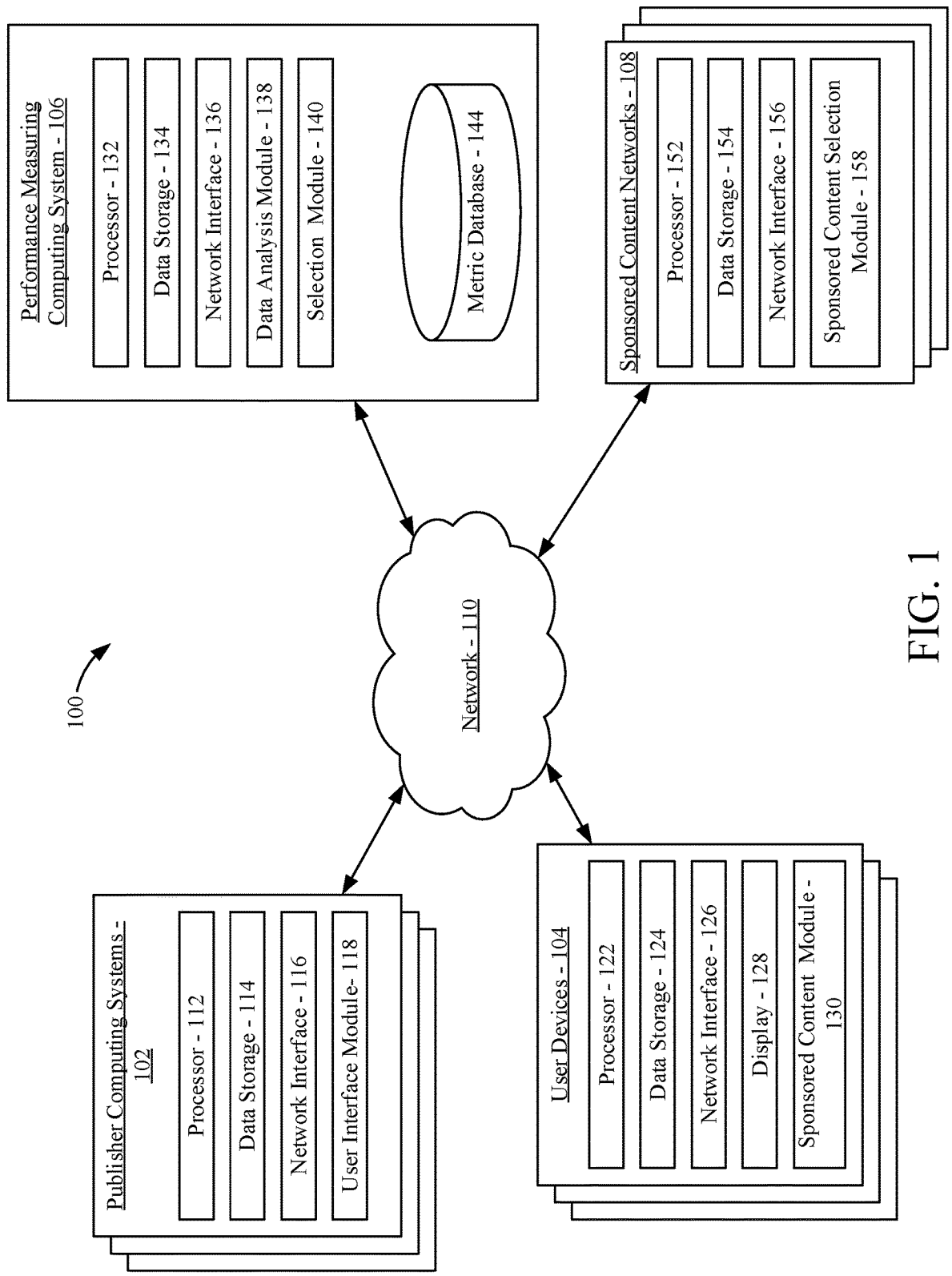
FIG. 1 is a block diagram depicting an implementation of an environment for measuring sponsored content item performance.

Prior to discussing the specifics of implementations of the systems and methods of measuring and quantifying the performance of sponsored content items, it may be helpful to discuss an implementation of an environment where such systems and methods may be deployed. FIG. 1 depicts one implementation of an environment 100. In brief overview, the environment comprises user devices 104, communicating over a network 110 to publisher computing systems 102 and sponsored content networks 108. A performance measuring computing system 106 communicates over the network 110 to publisher computing systems 102 as well as the user devices 104. The electronic user devices 104 may be any number of different types of personal and mobile devices configured to communicate via the network 110 (e.g., a laptop computer, a tablet computer, a smartphone, a digital video recorder, a set-top box for a television, a video game console, combinations thereof, etc.).

The network 110 may be any form of computer network that relays information between the publisher computing systems 102, the user devices 104, the performance measuring computing system 106 and the sponsored content networks 108. In other implementations, the network 110 may include the Internet and/or other types of data networks, such as a local area network (LAN), a wide area network (WAN), a cellular network, satellite network, or other types of data networks. The network 110 may also include any number of additional computing devices (e.g., computer, servers, routers, network switches, smartphones, tablets, mobile phones, etc.) that are configured to receive and/or transmit data within the network 110. These devices may aid connection to the network and may further use wireless communication methods such as a BLUETOOTH transceiver, a BLUETOOTH beacon, an RFID transceiver, Near Field Communication (NFC) transmitter or other similar technologies known in the art. The network 110 may further include any number of hardwired and/or wireless connections. For example, the user devices 104 may communicate wirelessly (e.g., via WI-FI, cellular, radio, etc.) with a transceiver that is hardwired (e.g., via a fiber optic cable, a CAT5 cable, etc.) to other computing devices for communication over the network 110 to communicate with the publisher computing systems 102. In some implementations, reliable communication methods are used over the network with acknowledgment and resend if there is no acknowledgment received.

Still referring to FIG. 1, the one or more publisher computing systems 102 as depicted include a processor 112, data storage 114, a network interface 116, and a user interface module 118. The data storage 114 may store machine instructions that, when executed by the processor 112, cause the processor 112 to perform one or more of the operations described herein. The processor 112 may include one or more microprocessors, application specific integrated circuits (ASICs), field programmable gate arrays (FPGAs), other forms of processing circuits, or combinations thereof. The data storage 114 may include, but is not limited to, electronic, optical, magnetic, or any other storage or transmission device capable of providing the processor 112 with program instructions. The data storage 114 may include storage devices such as a floppy disk, CD-ROM, DVD, magnetic disk, data storage chip, ROM, RAM, EEPROM, EPROM, flash data storage, optical media, or any other suitable data storage from which the processor 112 can read instructions. The processor 112 and the data storage 114 may form a processing module. The data storage 114 may include files to run an operating system and a user interface module 118. In some implementations, publisher computing systems 102 are servers that are associated with a publisher and compile and host data associated with the publisher to be displayed on user devices 104 accessing the publisher content via the network 110. The publisher data may be combined for display with sponsored content items obtained from one or more sponsored content networks 108 via the network 110. The publisher data may be combined for display with the sponsored content items at the user devices 104 without the sponsored content item ever being sent to or stored on the publisher computing system 102. In other implementations, the publisher computing systems 102 are any computing device associated with a publisher used to interact with a performance measuring computing system 106 for setting filters and rules for the selection of sponsored content items associated with one or more sponsored content networks 108 when a sponsored content item is requested by a user device 104 for display with content associated with the publisher.

The publisher computing systems 102 are shown to include a network interface 116. In some implementations, the network interface 116 is a hardware interface allowing data to pass to and from the network 110 (e.g., the internet). In some implementations, the network interface 116 includes the hardware and logic necessary to communicate over multiple channels of data communication. For example, the network interface 116 may include an Ethernet transceiver, a cellular modem, a BLUETOOTH transceiver, a BLUETOOTH beacon, an RFID transceiver, and/or an NFC transmitter. Data passing through the network interface 116 may be encrypted such that the network interface 116 is a secure communication module.

The publisher computing systems 102 are shown to include a user interface module 118. In some implementations, the user interface module 118 has been provided by the performance measuring computing system 106. The user interface module 118 may interact with a user of the publisher computing system 102 through a web browser interface. In other implementations, the user interface module 118 may be an application or other piece of software running on the publisher computing system 102 communicating to a performance measuring computing system 106 through an application program interface (API). In some implementations, the user interface module 118 is configured to accept input from a user associated with a publisher to set filters and rules for the selection of sponsored content networks 108 when a sponsored content item is requested by a user device 104 for display with content associated with the publisher.

The user devices 104 as depicted include a processor 122 and data storage 124. The data storage 124 may store machine instructions that, when executed by the processor 122, cause the processor 122 to perform one or more of the operations described herein. The processor 122 may include one or more microprocessors, application specific integrated circuits (ASICs), field programmable gate arrays (FPGAs), other forms of processing circuits, or combinations thereof. The data storage 124 may include, but is not limited to, electronic, optical, magnetic, or any other storage or transmission device capable of providing the processor 122 with program instructions. The data storage 124 may include storage devices such as a floppy disk, CD-ROM, DVD, magnetic disk, data storage chip, ROM, RAM, EEPROM, EPROM, flash data storage, optical media, or any other suitable data storage from which the processor 122 can read instructions. The processor 122 and the data storage 124 may form a processing module. The data storage 124 may include files to run an operating system and a sponsored content module 130.

The user devices 104 are shown to include a network interface 126. In some implementations, the network interface 126 is a hardware interface allowing data to pass to and from the network 110 (e.g., the internet). In some implementations, the network interface 126 includes the hardware and logic necessary to communicate over multiple channels of data communication. For example, the network interface 126 may include an Ethernet transceiver, a cellular modem, a BLUETOOTH transceiver, a BLUETOOTH beacon, an RFID transceiver, and/or an NFC transmitter. Data passing through the network interface 126 may be encrypted such that the network interface 126 is a secure communication module.

The user devices 104 include a display 128. In some implementations, the display 128 is combined with a user input device in the form of a touchscreen device. The display may be any electronic device that conveys data to a user by generating sensory information (e.g., a visualization, sounds, etc.). The display 128 may be internal to the housing of the user device 104 (e.g., a built-in display) or external to the housing of the user device 104 (e.g., a monitor connected to the user device 104), according to various implementations. For example, the user device 104 may include a display 128, which may display webpages, user interfaces for applications, and/or other visual sources of information. In various implementations, the display 128 may be located inside or outside of the same housing as that of the processor 122 and/or the data storage 124. For example, the display 128 may be an external display, such as a computer monitor, television set, or any other stand-alone form of electronic display. In other examples, the display 128 may be integrated into the housing of a laptop computer, mobile device, smartphone, tablet, or other form of computing device having an integrated display.

In some implementations, the display 128 and user input devices are combined in the form of a touchscreen device. The display 128 may be any electronic device that conveys data to a user by generating sensory information (e.g., a visualization, sounds, etc.). The input/output of a user device 104 (not shown) may be any electronic device that converts received information from a user into electronic signals (e.g., a keyboard, a mouse, a pointing device, a touch screen display, a microphone, etc.).

The user devices 104 are shown to include a sponsored content module 130. In some implementations, the sponsored content module 130 is configured to request a sponsored content item from an associated sponsored content network 108. The sponsored content serving module 130 is further configured to render the returned sponsored content item and handle interactions with the sponsored content including routing interactions with the sponsored content item to destination sites or landing URLs, launching of applications, counting clicks of the sponsored content item and the like.

The performance measuring computing system 106 as depicted include a processor 132, data storage 134, and a network interface 136. The data storage 134 may store machine instructions that, when executed by the processor 132, cause the processor 132 to perform one or more of the operations described herein. The processor 132 may include one or more microprocessors, application specific integrated circuits (ASICs), field programmable gate arrays (FPGAs), other forms of processing circuits, or combinations thereof. The data storage 134 may include, but is not limited to, electronic, optical, magnetic, or any other storage or transmission device capable of providing the processor 132 with program instructions. The data storage 134 may include storage devices such as a floppy disk, CD-ROM, DVD, magnetic disk, data storage chip, ROM, RAM, EEPROM, EPROM, flash data storage, optical media, or any other suitable data storage from which the processor 132 can read instructions. The processor 132 and the data storage 134 may form a processing module. The data storage 134 may include files to run an operating system, a data analysis module 138, and a selection module 140, as well as manage a metric database 144. In some implementations, one or more of these modules (e.g., the data analysis module 138, the selection module 140, etc.) may be operating on another system such as one of the user devices 104, one of the sponsored content networks 108, or a standalone computing system or server. For example, the user devices 104 could comprise the data analysis module 138 and configured to analyze the data prior to sending the analyzed data to the performance measuring computing system 106.

The performance measuring computing system 106 is shown to include a network interface 136. In some implementations, the network interface 136 is a hardware interface allowing data to pass to and from the network 110 (e.g., the internet). In some implementations, the network interface 136 includes the hardware and logic necessary to communicate over multiple channels of data communication. For example, the network interface 136 may include an Ethernet transceiver, a cellular modem, a BLUETOOTH transceiver, a BLUETOOTH beacon, an RFID transceiver, and/or an NFC transmitter. Data passing through the network interface 136 may be encrypted such that the network interface 136 is a secure communication module.

The performance measuring computing system 106 is shown to include a data analysis module 138. In some implementations, the data analysis module 138 is configured to communicate with publisher computing systems 102 and user devices 104. Communication with user devices 104 may include receiving performance data related to display of sponsored content items on the user devices 104. Communication with user devices 104 and publisher computing systems 102 may include sending filter settings, rules, or configuration settings related to a publisher concerning mediation of sponsored content items shown with the publisher content dependent on where the mediation is taking place. In such implementations, the data analysis module 138 is configured to receive performance data from user devices 104, including frame interval and idle time and compare the received performance data to one or more metrics stored in a metric database 144.

In some implementations, the data analysis module 138 is configured to calculate the time interval between frames and compare it to an expected interval (e.g., approximately '16.7' ms when a browser is animating at sixty frames per second). A lengthier interval may indicate lag and a poor user experience. In some implementations, the data analysis module 138 is configured to analyze time available to the browser for low priority tasks to determine the amount of work the browser has to do between frames. For example, if the time available is close to approximately '16.7' ms, then the browser is spending most of the time idle and is not overloaded with other tasks. In some implementations, the data analysis module 138 is configured to accumulate data for a set amount of time or a set amount of data points before analysis or receive accumulated data from the user device 104. In some implementations, the data analysis module 138 is configured to exclude outlier time intervals between frames or idle times from the analysis. In some implementations, the data analysis module 138 is configured to include only average values of the time interval or idle times of a plurality of data points is included in the analysis. In some implementations, the data analysis module 138 is configured to calculate deviations and or averages of square differences from the received time interval and/or idle times for inclusion in the analysis. In some implementations, analysis of the received data further comprises correlating performance to one or more features extracted from the sponsored content item. Features extracted from the sponsored content item may include the use of certain libraries, the use by the sponsored content item of features of the web browser executing the sponsored content item, and the like.

The performance measuring computing system 106 is shown to include a selection module 140. In some implementations, the selection module 140 is configured to select a sponsored content item based on satisfying a threshold value of the metric associated with the received parameter from a plurality of sponsored content items that satisfy the threshold value. Selection of the sponsored content item may include request the sponsored content item from a sponsored content network 108. In some implementations, the selection module 140 is configured to generate or retrieve a list of suitable sponsored content items and/or suitable sponsored content networks 108 for the particular requesting user device 104. In some implementations, the selection module 140 is configured to generate or retrieve a list of suitable sponsored content items and/or suitable sponsored content networks associated with the received parameter. In some implementations, a potential sponsored content item is not selected based on failure to satisfy a threshold value of the metric associated with the received parameter.

The performance measuring computing system 106 is shown to include a metric database 144. In some implementations, the metric database 144 is configured to be indexed by parameters, metrics, specific content items or a combination. In some implementations, the metric database 144 is configured to store metrics including one or more threshold values associating one or more parameters of platforms displaying sponsored content items with particular sponsored content networks 108. The metric database 144 can also be configured, for each platform or platform parameter for a first sponsored content item, to store one or more threshold values associating one or more parameters of the platform displaying the animation with the first content item. Parameters of platforms may include device models, type of operating system, versions of operating systems, types of browsers executing the sponsored content items, versions of the browsers, a type of web browser, publisher identifier, publisher information of the publisher content associated with the sponsored content item (e.g., publisher identifier), and the like. The metric may include a correlation of poor performance of a sponsored content item to the parameter associated with the request for a sponsored content item. For example, the parameter may indicate a certain web browser will be used to display the sponsored content item and a value of a metric correlating each of a plurality of possible sponsored content items is retrieved from the database, the value of a metric correlated with a level of performance of each of the plurality of possible sponsored content items. In another example the parameter may indicate a device model number will be used to display the sponsored content item and a value of a metric correlating each of a plurality of possible sponsored content items is retrieved from the database, the value of a metric correlated with a level of performance of each of the plurality of possible sponsored content items.

In some implementations, one or more of the data analysis or selection (e.g., the data analysis module 138 and selection module 140) may be done on a separate computer system than the performance measuring computing system 106 with the results of the data analysis and selection sent to the performance measuring computing system 106. Various modules as depicted in the performance measuring computing system 106 may be done on other computing systems and servers and are not limited to the implementation as depicted. In some implementations, the sponsored content module 130 may be on the performance measuring computing system 106 or other computing system other than the user device 104 (e.g., in a server side mediated environment). In such an arrangement, the data analysis and sponsored content item selection may be done prior to the serving of the sponsored content item to a user device 104 and a 'pre-filtering' of the sponsored content items can be accomplished using publisher metrics set by the publisher. Pre-filtering may also be done for blacklisted sponsored content items served by any sponsored content network 108, with the sponsored content items identified by a hash of the image content of the sponsored content item, by the destination URL associated with the sponsored item, or by other unique criteria identifiable in the sponsored content item. In some implementations, the performance measuring computing system 106 may be configured to receive additional information associated with a sponsored content item ID from a publisher computing system 102 including click through rates, conversion rates, impressions, and the like, associated with the sponsored content item and the publisher and/or click through rates, conversion rates, impressions, and total revenue associated with a sponsored content network 108 and the publisher.

Still referring to FIG. 1, the sponsored content networks 108 as depicted include a processor 152, data storage 154, and a network interface 156. The data storage 154 may store machine instructions that, when executed by the processor 152, cause the processor 152 to perform one or more of the operations described herein. The processor 152 may include one or more microprocessors, application specific integrated circuits (ASICs), field programmable gate arrays (FPGAs), other forms of processing circuits, or combinations thereof. The data storage 154 may include, but is not limited to, electronic, optical, magnetic, or any other storage or transmission device capable of providing the processor 152 with program instructions. The data storage 154 may include storage devices such as a floppy disk, CD-ROM, DVD, magnetic disk, data storage chip, ROM, RAM, EEPROM, EPROM, flash data storage, optical media, or any other suitable data storage from which the processor 152 can read instructions. The processor 152 and the data storage 154 may form a processing module. The data storage 154 may include files to run an operating system and a sponsored content selection module 158.

The sponsored content networks 108 are shown to include a network interface 156. In some implementations, the network interface 156 is a hardware interface allowing data to pass to and from the network 110 (e.g., the internet). In some implementations, the network interface 156 includes the hardware and logic necessary to communicate over multiple channels of data communication. For example, the network interface 156 may include an Ethernet transceiver, a cellular modem, a BLUETOOTH transceiver, a BLU- ETOOTH beacon, an RFID transceiver, and/or an NFC transmitter. Data passing through the network interface 156 may be encrypted such that the network interface 156 is a secure communication module.

The sponsored content networks 108 are shown to include a sponsored content selection module 158. In some implementations, the sponsored content selection module 158 is configured to communicate with user devices 104. Configuration for communication with user devices 104 may include being configured to receive sponsored content requests from sponsored content modules 130 executing on the user devices 104. In some implementations, additional data accompanies or is contained in the request regarding type of sponsored content, format, category, and/or display requirements of the requesting user device 104. In some implementations, the sponsored content selection module 158 is configured to communicate with a performance measuring computing system 106 to determine a selection of a sponsored content item in response to the request. In some implementations, the sponsored content networks 108 are configured to receive a request or a sponsored content item from the performance measuring computing system 106, the request for a sponsored content item from the requesting user device 104 having first gone to the performance measuring computing system 106.

B. Methods for Measuring and Quantifying the Performance of Media such as Sponsored Content Items Referring now to FIG. 2, a block diagram of a method 200 of receiving and analyzing data to generate an updated value of a metric is shown. In some implementations, the method 200 is performed by a processor 132 running instructions from data storage 134 on a performance measuring computing system 106 while updating data in a metric database 144. While performing the method 200, the performance measuring computing system 106 communicates data over a network interface 136 over a network 110 to a network interface 126 of a user device 104. In brief overview of method 200, the method 200 includes the steps of receiving first data comprising an identifier of a sponsored content item, receiving second data comprising a parameter of a platform displaying the sponsored content item, receiving third data associated with a time interval, analyzing received data, generating an updated value of a metric based on the analysis, and updating a table associated with sponsored content networks 108 based on the metric.

Still referring to FIG. 2 and in more detail, the method 200 begins when first data comprising an identifier of a sponsored content item is received at 204. In some implementations, the data comprises a unique identifier that can be used to determine the sponsored content item. The sponsored content item may have been requested by a user device 104 and transmitted to the user device 104. In some implementations, the data comprises a unique identifier of the sponsored content item and can be used to determine the sponsored content item as well as the sponsored content network 108 associated with the sponsored content item. In some implementations, the unique identifier is already known because it is known which sponsored content item was transmitted to the user device 104. In some implementations, the unique identifier is received from the user device 104.

Second data comprising a parameter of a platform displaying the sponsored content item is received at 206. In some implementations, the parameter may include identifying information of a browser displaying the sponsored content item, identifying information of an operating system running on the user device 104, a model number of the user device 104, identifying information of publisher content or website associated with the display of the sponsored content item, and the like. In some implementations one or more parameters (e.g., browser type, browser version, and operating system) may be obtained by obtaining the user agent ID. In some implementations received first data, second data, and third data is received through a technique where the user device 104 sends the data to be logged via a GET request (HTTP request method) to a specific end-point on the server (e.g., the performance measuring computing system 106). The server logs the request and response with code '204' (no response) and an empty body. The received logs are then filtered by their report identifiers (id) and processed in batch. In some implementations, the data is embedded in a parameter (e.g., a "msg" parameter, a custom parameter, and the like). In some implementations time interval measurements or data are compiled as an array of integers to be reported back to the server (e.g., the performance measuring computing system 106). A string is created by the user device 104 by joining all the integers using commas and the string is the message parameter. In some implementations, the string is prefixed with a label to specify the type of measurement reported. In some implementations, a custom parameter is used as an identifying label.

Third data associated with a time interval is received at 208. In some implementations, the time interval comprises the interval between two consecutive frames of media displayed on a user device 104 and is determined on the user device 104. In some implementations, one or method calls to a browser displaying the media are used to gather data associated with the time interval. For example, by calling the method requestAnimationFrame to receive a call back time, the interval between frames can be measured by keeping track of the previous call back time with the difference between the current callback time and the previous callback time giving the frame interval. The frame interval between two consecutive frames is also the reciprocal of the frames per second of the displayed media. In some implementations, time interval information comprising a measurement of the idle time in a frame of the media is received instead of or in addition to the interval between two consecutive frames of the media displayed. In some implementations, one or more method calls to a browser displaying the media are used to gather data associated with the idle time between frames. For example, the measurement of the idle time in a frame of the media is obtained by calling the method requestIdleCallback which returns a measurement of time available to a browser for low priority tasks. Third data may include time data associated with time intervals between frames and/or idle times gathered for a set amount of time (e.g., for 10 seconds) and the data comprises time data for a plurality of or all of the frames of media during the set amount of time. Third data may also include time data associated with a set number of frames/frame intervals (e.g., 600 frame intervals) and the data comprises time data for a plurality of or all of the frames of those set number of frames. In some implementations the executed script (e.g., JavaScript) to determine these call back times and/or measurements of idle times is included in a container page of the media (e.g., a sponsored content item video). In some implementations, the container page runs on a browser running on the user device 104.

In some implementations, the data received is encoded (e.g., by the user device 104) to reduce the size of the data being sent and received. For example, the data needing to be encoded may consist of six-hundred frame intervals and six-hundred idle times. In one specific example of encoding, frame intervals may be practically limited from below (e.g., by '16' ms). An upper limit can also be set (e.g., between '1000' ms to '10000' ms). Idle times, conversely, may be limited as a practical matter from above (e.g., by '16' ms) if something is being rendered onto the viewport and at another value otherwise (e.g. '50' ms). The lower limit for idle times is '0' ms, for example, if a browser on the user device 104 is completely occupied. In one specific implementation of the above example, Base64 encoding may be used. Each character in Base64 encoding can take sixty-four different values. In one example, one character, using one byte, may represent idle times and two characters, using two bytes, may be used to represent frame intervals. This allows for a representation of frame intervals between the lower limit and upper limit in '4096' increments (64*64). For example, when the lower limit is '16' ms and the upper limit is '8208' ms, then two characters supplies enough information to represent '16' ms to '8208' ms in increments of '2' ms. The above six-hundred frame intervals and six-hundred idle times can be represented using eighteen-hundred bytes with each character needing one byte (six-hundred bytes needed for the six-hundred frame intervals and twelve-hundred bytes needed for the six-hundred idle times as each idle time uses two characters). In another implementation of the above example, frame intervals may be represented in a logarithmic scale when the coarseness of the logarithmic scales for large values is more acceptable. In one example, base '1.1447' is used for the logarithm, and the numbers in the range from sixteen to five-thousand can be represented in six bits using select and distinct integers. In another implementation of the above example, the arrays are compressed using run length encoding (RLE) as an effective way to compress the data in circumstances where the frame intervals and/or idle times have a tendency to repeat.

The received data is analyzed at 210. In some implementations, the time interval between frames can be calculated and compared to an expected interval (e.g., approximately '16.7' ms when a browser is animating at sixty frames per second). A lengthier interval may indicate lag and a poor user experience. In some implementations, time available to the browser for low priority tasks can also be analyzed to determine the amount of work the browser has to do between frames. For example, if the time available is close to approximately '16.7' ms, then the browser is spending most of the time idle and is not overloaded with other tasks. In some implementations, the data is accumulated for a set amount of time or a set amount of data points before analysis or before being sent from the user device 104 (e.g., to a performance measuring computing system 106). In some implementations, outlier time intervals between frames or idle times are excluded from the analysis, only average values of the time interval or idle times of a plurality of data points is included in the analyses. In some implementations, deviations and or averages of square differences are also calculated from the received time interval and/or idle times and included in the analysis. In some implementations, analysis of the received data further comprises correlating performance to one or more features extracted from the sponsored content item. Features extracted from the sponsored content item may include the use of certain libraries, the use by the sponsored content item of features of the web browser executing the sponsored content item, and the like.

An updated value of a metric based on the analysis is generated at 212. In some implementations, possible metrics include one or more threshold values associating one or more parameters of platforms displaying sponsored content items with particular sponsored content items. In some implementations, possible metrics include one or more threshold values associating one or more parameters of platforms displaying sponsored content items with particular sponsored content networks 108. Parameters of platforms may include device models, types of operating systems, versions of operating systems, types of browsers executing the sponsored content items, versions of the browsers, publisher information of the publisher content associated with the sponsored content item, a category of publisher content, and the like. In some implementations, the parameter affects a stored metric (e.g., in the metric database 144) and a metric is adjusted or a weight associated with the metric is adjusted based on the updated parameter. For example, if a correlation is determined or strengthened of poor performance on a certain web browser, than a metric associating a particular sponsored content item with the web browser can be adjusted and used in determinations of what sponsored content items to serve to certain web browsers or certain user devices 104. If there is a second request for a second sponsored content item with the parameter identifying the certain web browser, the particular sponsored content item will not be chosen or will be less likely to be chosen. Correlations can also be combined by correlating performance values with two or more parameters of platforms. For example, poorer performance is seen more often when a certain web browser is used on a certain operating system of a user device 104 for a particular sponsored content item. Adjustments of metrics can also be based on other known factors of the parameters of the platforms (e.g., device models, operating systems, browsers, etc.) For example, certain web browsers may handle poorly performing sponsored content items better than others or may handle poorly perform sponsored content items up to a certain threshold better than others. In some implementations, selection of a sponsored content item (or a second selection of the sponsored content item after a metric has been updated) is done based on the updated value of the metric. If the updated value of the metric for a sponsored content item exceeds a poor performance threshold for a particular parameter of the requesting platform, the sponsored content item is not selected or is less likely to be selected.

A table or list of sponsored content networks 108 is updated based on the metric at 214. In some implementations, the table or list is only updated when application of the metric results in one or more specific sponsored content networks 108 or one or more specific sponsored content items from the one or more specific sponsored content networks 108 being excluded from requests for sponsored content items from user devices 104 associated with one or more parameters.

A parameter associated with the sponsored content item is updated at 216. In some instances, the parameter is updated to improve or attempt to improve the performance of the sponsored content item on one or more platforms. In some implementations, the sponsored content item is excluded from selection until the parameter has been updated or another fix has been applied to the sponsored content item. In some implementations, the sponsored content item is removed entirely from a possibility of selection depending on the analysis of the received data. In some implementations, the sponsored content item is penalized in sponsored content item selection auctions.

Referring now to FIG. 3, a block diagram of a method 300 for selecting a sponsored content item in response to a request is shown. In some implementations, the method 300 is performed by is performed by a processor 132 running instructions from data storage 134 on a performance measuring computing system 106 while retrieving data in a metric database 144. While performing the method 300, the performance measuring computing system 106 communicates data over a network interface 136 over a network 110 to a network interface 126 of a user device 104 and/or a network interface 156 of a sponsored content network 108.

Still referring to FIG. 3 and in more detail, the method 300 begins when a request for a sponsored content item comprising a parameter of a platform to display the item is received at 302. In some implementations, the parameter information is received separately from the request for the sponsored content item. In some implementations, the request comprises a request for a specific sponsored content item, a category for a sponsored content item, demographic information for selection of a sponsored content item, and the like. In some implementations, the data associated with the request for a sponsored content item is first sent to a sponsored content network 108 before being received. The sponsored content network 108 may append additional data such as one or more suggested sponsored content items for responding to the request.

A metric associated with the parameter is retrieved at 304. In some implementations, the metric associated with the parameter is retrieved from a database (e.g., metric database 144). The metric may have an updated value based on correlated performance to the parameter for a particular sponsored content item on systems (e.g., user devices 104) associated with the parameter. In some implementations the metric database 144 is indexed by parameters, metrics, sponsored content item identifiers, or a combination. In some implementations, possible metrics include one or more threshold values associating one or more parameters of platforms displaying sponsored content items with particular sponsored content networks 108. Parameters of platforms may include device models, types of operating systems, versions of operating systems, types of browsers executing the sponsored content items, versions of the browsers, publisher information of the publisher content associated with the sponsored content item, and the like. The metric may include a correlation of poor performance of a sponsored content item to the parameter associated with the request for a sponsored content item. For example, the parameter may indicate a certain web browser will be used to display the sponsored content item and a value of a metric correlating each of a plurality of possible sponsored content items is retrieved from the database, the value of a metric correlated with a level of performance of each of the plurality of possible sponsored content items.

The sponsored content item is selected based on the metric at 306. In some implementations, the sponsored content item is selected based on satisfying a threshold value of the metric associated with the received parameter from a plurality of sponsored content items that satisfy the threshold value. A list of suitable sponsored content items and/or suitable sponsored content networks may be generated for the particular requesting user device 104 or generated associated with the received parameter. In some implementations, a potential sponsored content item is not selected based on failure to satisfy a threshold value of the metric associated with the received parameter. For example, a sponsored content item is transmitted to a user device 104 where poor performance on the user device causes a value of a metric associated with a parameter of the user device 104 to be updated. The next time a sponsored content item is requested from and transmitted to the particular user device 104, a second sponsored content item different than the first, sent sponsored content item is transmitted consequent to the updated value of the metric associated with the parameter.

C. Network and Computing Environment

Figure 4:
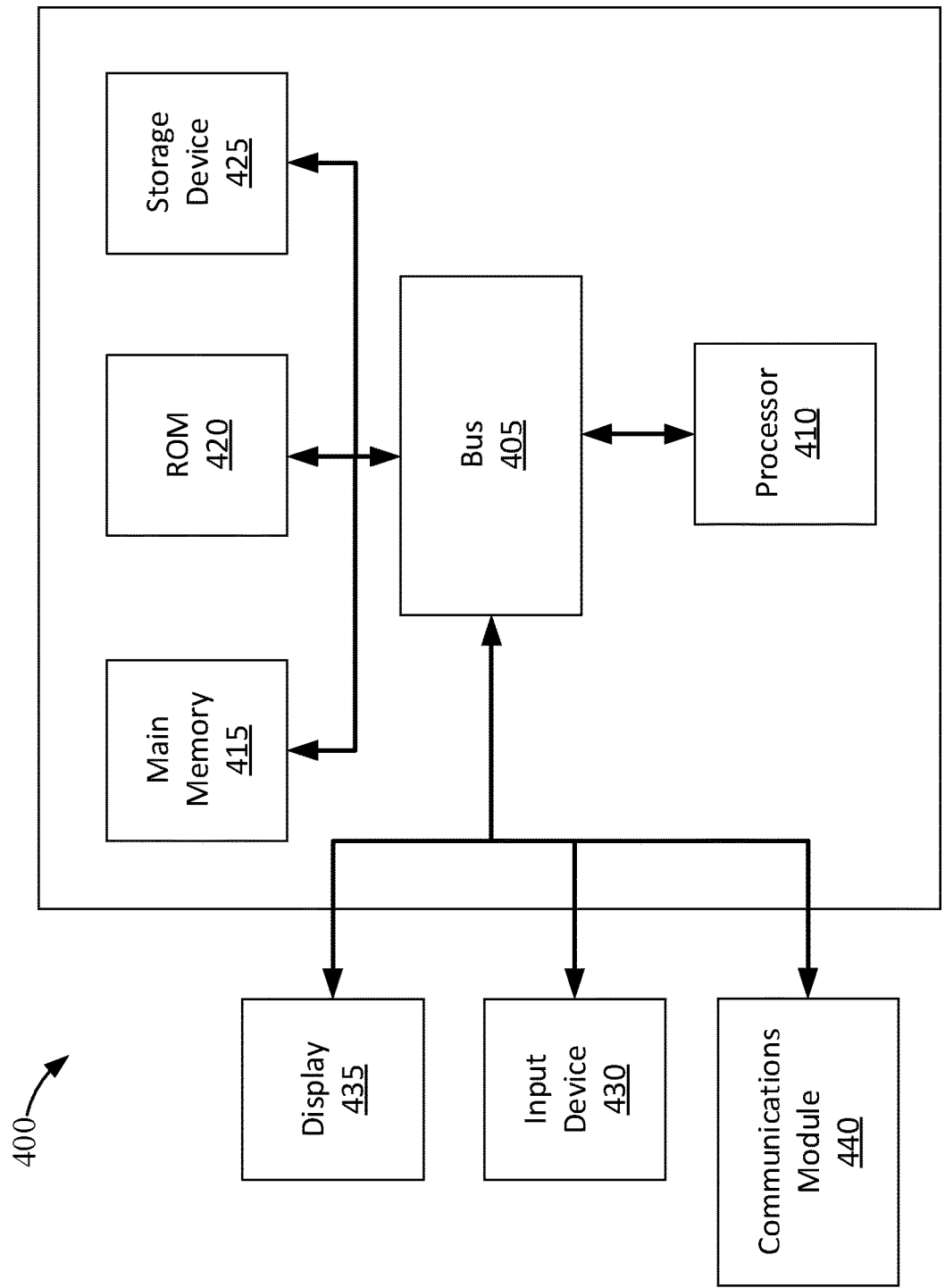
FIG. 4 is a block diagram depicting a general architecture for a computer system that may be employed to implement various elements of the systems and methods described and illustrated herein.

FIG. 4 is a block diagram of a computing system 400 that can be used to implement the publisher computing systems 102, the user devices 104, the performance measuring computing system 106, the sponsored content networks 108 and/or any other computing device described herein. The computing system 400 includes a bus 405 or other communication component for communicating information and a processor 410 or processing module coupled to the bus 405 for processing information. The computing system 400 also includes a main data storage 415, such as a RAM or other dynamic storage device, coupled to the bus 405 for storing information, and instructions to be executed by the processor 410. The main data storage 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid state device, magnetic disk or optical disk, is coupled to the bus 405 for persistently storing information and instructions. The computing system 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.), etc.

The computing system 400 may be coupled via the bus 405 to a display 435, such as a Liquid Crystal Display (LCD), Thin-Film-Transistor LCD (TFT), an Organic Light Emitting Diode (OLED) display, LED display, Electronic Paper display, Plasma Display Panel (PDP), and/or other display, etc., for displaying information to a user. An input device 430, such as a keyboard including alphanumeric and other keys, may be coupled to the bus 405 for communicating information and command selections to the processor 410. In another implementation, the input device 430 may be integrated with the display 435, such as in a touch screen display. The input device 430 can include a cursor control, such as a mouse, a trackball, or cursor direction keys, for communicating direction information and command selections to the processor 410 and for controlling cursor movement on the display 435.

According to various implementations, the processes and/or methods described herein can be implemented by the computing system 400 in response to the processor 410 executing an arrangement of instructions contained in the main data storage 415. Such instructions can be read into the main data storage 415 from another computer-readable medium, such as the storage device 425. Execution of the arrangement of instructions contained in the main data storage 415 causes the computing system 400 to perform the illustrative processes and/or method steps described herein. One or more processors in a multi-processing arrangement may also be employed to execute the instructions contained in the main data storage 415. In alternative implementations, hard-wired circuitry may be used in place of or in combination with software instructions to effect illustrative implementations. Thus, implementations are not limited to any specific combination of hardware circuitry and software.

The computing system 400 also includes a communications module 440 that may be coupled to the bus 405 for providing a communication link between the computing system 400 and the network 110. As such, the communications module 440 enables the processor 410 to communicate, wired or wirelessly, with other electronic systems coupled to the network 110. For instance, the communications module 440 may be coupled to an Ethernet line that connects the computing system 400 to the Internet or another network 110. In other implementations, the communications module 440 may be coupled to an antenna (not shown) and provides functionality to transmit and receive information over a wireless communication interface with the network 110.

In various implementations, the communications module 440 may include one or more transceivers configured to perform data communications in accordance with one or more communications protocols such as, but not limited to, WLAN protocols (e.g., IEEE 802.11 a/b/g/n/ac/ad, IEEE 802.16, IEEE 802.20, etc.), PAN protocols, Low-Rate Wireless PAN protocols (e.g., ZIGBEE, IEEE 802.15.4-2003), Infrared protocols, BLUETOOTH protocols, EMI protocols including passive or active RFID protocols, and/or the like.

The communications module 440 may include one or more transceivers configured to communicate using different types of communication protocols, communication ranges, operating power requirements, RF sub-bands, information types (e.g., voice or data), use scenarios, applications, and/or the like. In various implementations, the communications module 440 may comprise one or more transceivers configured to support communication with local devices using any number or combination of communication standards. In various implementations, the communications module 440 can also exchange voice and data signals with devices using any number of standard communication protocols.

Although an example computing system 400 has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access data storage array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The terms "data processing apparatus," "computing device," or "processing circuit" encompass all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only data storage or a random access data storage or both. The essential elements of a computer are a processor for performing actions in accordance with instructions and one or more data storage devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile data storage, media and data storage devices, including by way of example semiconductor data storage devices, e.g., EPROM, EEPROM, and flash data storage devices; magnetic disks, e.g., internal hard disks or removable disks; magneto-optical disks; and CD-ROM and DVD disks. The processor and the data storage can be supplemented by, or incorporated in, special purpose logic circuitry.

To provide for interaction with a user, implementations of the subject matter described in this specification can be implemented on a computer having a display device, e.g., a CRT (cathode ray tube) or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method implemented on a computing device comprising:

receiving, via a network connection, first data identifying a time interval between a value of a first timestamp and a value of a second time stamp, the first timestamp and second timestamp obtained consequent to a script executing on a browser, the script when executed, executing operations to:
send, to the browser, a first request to call a specified function to return an object comprising a function which returns a value of a time remaining to do work or a value of zero,
receive, consequent to sending the first request, the value of the time remaining to do work or the value of zero, and
store the value of the time remaining to do work or the value of zero; and receiving, via the network connection, second data comprising an identifier of a first sponsored content item associated with an animation;

receiving, via the network connection, third data comprising a parameter of a platform displaying the animation;

generating an updated value of a metric of the first sponsored content item based on the value of the time remaining to do work or the value of zero;

storing the updated value of the metric and an association of the updated value of the metric with the first sponsored content item and the third data;

receiving a request for a sponsored content item, the request comprising data matching a value of the third data;

selecting a second sponsored content item other than the first sponsored content item based on the updated value of the metric associated with the first sponsored content item and the third data;

transmitting, via the network connection, the second sponsored content item.

2. The method of claim 1, wherein the metric of the first sponsored content item is one or more threshold values associating one or more parameters of the platform displaying the animation with the first sponsored content item.

3. The method of claim 2, wherein the one or more parameters of the platform are one or more of a device model number, a type of operating system, a version of an operating system, a type of web browser, a version of a web browser, publisher identifier, or a category of publisher content.

4. The method of claim 1, wherein the specified function is requestIdlecallback.

5. The method of claim 1, wherein the method comprises receiving a plurality of values of the time remaining to do work or the value of zero including the value of the time remaining to do work or the value of zero, and wherein the generated updated value of the metric is based at least on an average value of the plurality of values of the time remaining to do work or the value of zero.

6. The method of claim 1, wherein the method comprises receiving a plurality of values of the time remaining to do work or the value of zero including the value of the time remaining to do work or the value of zero, and wherein the generated updated value of the metric is based at least on a deviation of the plurality of values of the time remaining to do work or the value of zero.

7. The method of claim 1, wherein the method comprises receiving a plurality of values of the time remaining to do work or the value of zero including the value of the time remaining to do work or the value of zero, and wherein the generated updated value of the metric is based at least on an average of square differences of the plurality of values of the time remaining to do work or the value of zero.

8. A method implemented on a computing device comprising:
sending, to a browser executing on the computing device, a first request to call a specified function to update an animation of a first sponsored content item;
determining, consequent to sending the first request, a first timestamp;
sending, to the browser, a second request to call the specified function to update the animation;
determining, consequent to sending the second request, a second timestamp;
calculating a time interval using the first timestamp and the second timestamp;
generating a metric of the first sponsored content item based on the time interval above a predetermined value of the time interval;
sending, to a server via a network connection, first data comprising an identifier of the first sponsored content, a parameter of a platform displaying the animation, and the metric;
sending, to the server via the network connection, a request for a second sponsored content item, the request comprising data matching the parameter of the platform displaying the animation; and
receiving, from the server via the network connection, the second sponsored content item.

9. The method of claim 8, further comprising
sending, to the browser, a third request to call a second specified function to return an object comprising a function which returns a value of a time remaining to do work or a value of zero;
executing the function of the object to get the value of the time remaining to do work or the value of zero;
storing the value of the time remaining to do work or the value of zero; and
further basing the generated metric metric of the first sponsored content item on the value of the time remaining to do work or the value of zero.

10. The method of claim 8, wherein the specified function to update an animation is requestAnimationFrame.

11. The method of claim 8, wherein the metric of the first sponsored content item is one or more threshold values associating one or more parameters of the platform displaying the animation with the first sponsored content item.

12. The method of claim 9, wherein the second specified function is requestIdlecallback.

13. The method of claim 12, wherein the specified function to update an animation is requestIdlecallback.

14. The method of claim 10, wherein the one or more parameters of the platform are one or more of a device model number, a type of operating system, a version of an operating system, a type of web browser, a version of a web browser, publisher identifier, or a category of publisher content.

15. A system comprising:
one or more processors;
a network connection; and
data storage that is operatively coupled to the one or more processors, wherein the data storage stores instructions that, when executed by the one or more processors, cause the one or more processors to perform operations comprising:
receive, via the network connection, first data identifying a time interval between a value of a first timestamp and a value of a second time stamp, the first timestamp and second timestamp obtained consequent to a script executing on a browser, the script when executed, executing operations to:
send, to the browser, a first request to call a specified function to return an object comprising a function which returns a value of a time remaining to do work or a value of zero,
receive, consequent to sending the first request, the value of the time remaining to do work or the value of zero, and
store the value of the time remaining to do work or the value of zero; and
receive, via the network connection, second data comprising an identifier of a first sponsored content item associated with an animation;
receive, via the network connection, third data comprising a parameter of a platform displaying the animation;
generate an updated value of a metric of the first sponsored content item based on the value of the time remaining to do work or the value of zero;
store the updated value of the metric and an association of the updated value of the metric with the first sponsored content item and the third data;
receive a request for a sponsored content item, the request comprising data matching a value of the third data;
select a second sponsored content item other than the first sponsored content item based on the updated value of the metric associated with the first sponsored content item and the third data;
transmit, via the network connection, the second sponsored content item.

16. The system of claim 15, wherein the metric of the first sponsored content item is one or more threshold values associating one or more parameters of the platform displaying the animation with the first sponsored content item.

17. The system of claim 16, wherein the one or more parameters of the platform are one or more of a device model number, a type of operating system, a version of an operating system, a type of web browser, a version of a web browser, publisher identifier, or a category of publisher content.

18. The system of claim 15, wherein the specified function is requestIdlecallback.

19. The system of claim 15, wherein the script when executed further executes operations to receive a plurality of values of the time remaining to do work or the value of zero including the value of the time remaining to do work or the value of zero, and wherein the generated updated value of the metric is based at least on an average value of the plurality of values of the time remaining to do work or the value of zero.

20. The system of claim 15, wherein the script when executed further executes operations to receive a plurality of values of the time remaining to do work or the value of zero including the value of the time remaining to do work or the value of zero, and wherein the generated updated value of the metric is based at least on a deviation of the plurality of values of the time remaining to do work or the value of zero.

* * * * *